July 24, 1956 E. A. LEWIS ET AL 2,756,424

WIRE GRID FABRY-PEROT TYPE INTERFEROMETER

Filed April 30, 1952

INVENTORS.
EDWARD A. LEWIS
JOSEPH P. CASEY JR.
BY Theodore C. Wood
AGENT
and Wade Koontz
ATTORNEY United States Patent Office 2,756,424

Patented July 24, 1956

2,756,424

WIRE GRID FABRY-PEROT TYPE INTERFEROMETER

Edward A. Lewis, West Roxbury, and Joseph P. Casey, Jr., Newton, Mass.

Application April 30, 1952, Serial No. 285,296

1 Claim. (Cl. 343—909)

Figure 1:
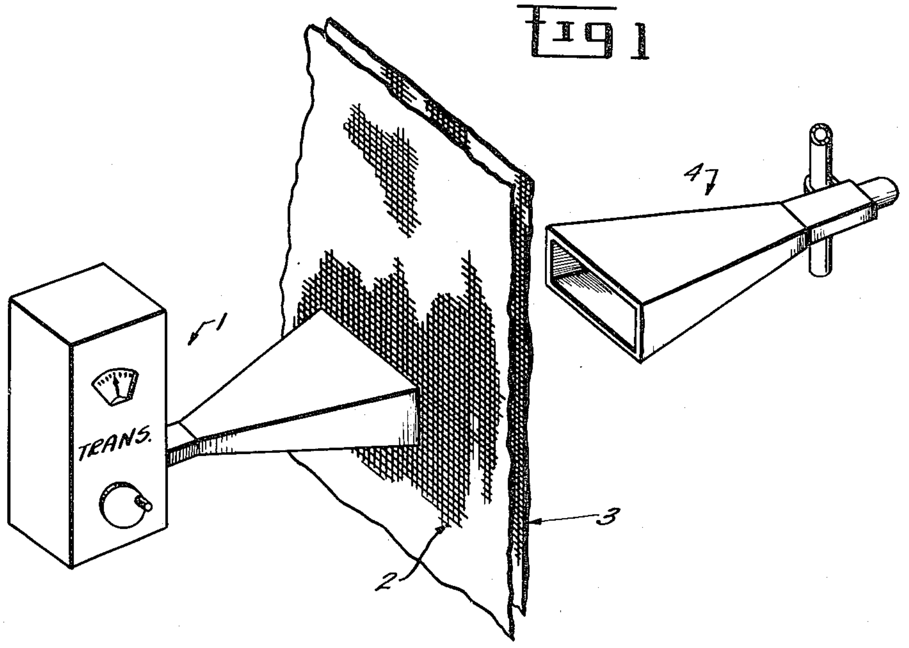

(Granted under Title 35, U. S. Code (1952), sec. 266)

The invention described in the specification and claims may be manufactured and used by or for the Government for governmental purposes, without the payment to us of any royalty thereon.

This invention relates to transmission and reflection of radiant energy waves.

It has been known that a grid consisting of parallel electrical conductors will selectively reflect or transmit radiant energy provided that the electrical conductors are of proper dimensions and spacing of the wires is proper. Single grids of this nature have been analyzed and discussed in the article entitled "The transmissibility of electromagnetic waves through wire grids," by Wessel, which appeared in volume 54 (1939) of Hochfrequenztechnik, on pages 62 through 69.

According to this invention two grids are placed parallel to each other. Assuming that it is desirable that the grids pass a predetermined wave length of radiation and will not pass wave lengths above or below the predetermined wave length, the diameter of the wires of the grids and the distance from the axis to axis of the wires of each grid are so chosen that the radiation having the predetermined wave length will be reflected from the first grid and the value of the absolute amplitude of the reflection coefficient of each grid by itself will be greater than zero and less than one. The closer this value is to one, the narrower will be the band of frequencies which will be passed through the two grids. The spacing between the two grids is then determined and this spacing will result in the maximum amount of the radiation having the predetermined wave length being passed through the two grids. A pair of grids constructed according to the above may be used in various types of radiant energy apparatus, for example, these grids may be constructed in such a way to act as a filter for radiant energy waves. Grids so constructed may be used for frequency measurement, for measurement of dielectric properties, for detection of small mechanical displacements, and for modulation of beams of radiation.

Although interference filters as such are known, that type of filter has previously been constructed using elements of partially transmitting and partially reflecting continuous metal films and have had the undesirable characteristic of a very low transmission efficiency. Since the elements of the filter in accordance with the principles of this invention are constructed of spaced conductors the radiation that is desired to be transmitted will pass through the space between conductors without loss in amplitude.

It is an object of this invention to provide apparatus which may be used to modify a beam of radiant energy.

It is a further object of this invention to provide an interference filter having a high transmission efficiency. advantages of this invention will be more clearly understood in view of the following description when taken in conjunction with the drawing wherein:

The above objects as well as other objects, features and Fig. 1 is a perspective view illustrating apparatus employing an interference type filter constructed in accordance with the principles of this invention.

Figure 2:
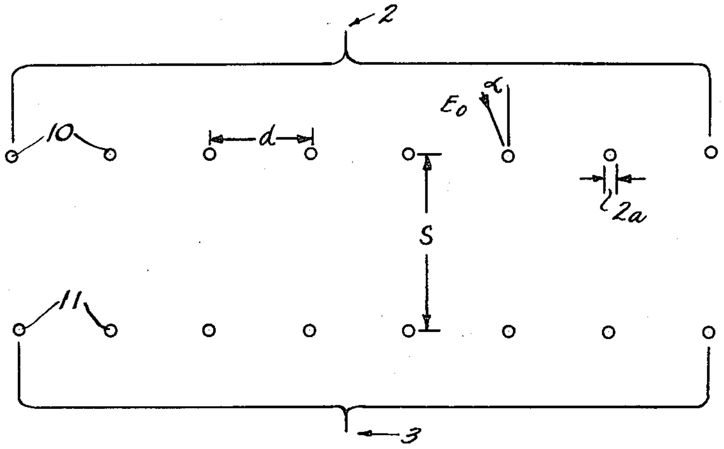

Fig. 2 is a simplified diagram of the interference filter constructed in accordance with the principles of this invention.

Reference is made to the drawing and more particularly to Fig. 1 thereof wherein the radiation from a source of radiant energy 1 passes through a first screen 2 and a second screen 3 and the radiation which passes through those screens is received in receiver 4. The source of radiant energy 1 preferably is of the electromagnetic radiation energy source having a frequency in the infrared spectrum or the microwave spectrum although it may have a frequency in other regions of the electromagnetic spectrum. The screens 2 and 3 are preferably identical in construction and consist of parallel spaced electrical conductors and may consist only of parallel conductors forming a grating or they may consist of parallel crossed wires in a grid form, the term screen as used in this specification and in the claims is intended to refer to either a grating or a grid. In the event that the radiant energy source is polarized in one plane, then the screen may consist of parallel conductors in grating form wherein the conductors are polarized parallel to the electrical vector.

Referring now to Fig. 2, the first grid will consist of parallel wires 2 and the second grid will consist of parallel wires 3. In this figure the angle between the incoming wave and the normal to the grid is indicated as $\alpha$. The electrical vector $E_0$ is parallel to the wires. The axis to axis spacing of the parallel conductors of the grid is indicated by $d$ and the diameter of the conductors is $2a$. The spacing between the first grid and the second grid is indicated as $s$.

When the incident radiation arrives at a single grid a portion thereof will be reflected provided that an axis to axis spacing of the conductors has a value other than the wave length of the incident radiation. The relative amplitude of the reflected wave from a single screen is:

$$\rho=\frac{1}{\sqrt{\left(1+\frac{R_i d\cos\alpha}{60\pi}\right)^2+\left(\frac{2d\cos\alpha}{\lambda}\left\{ln\frac{d}{2\pi a}+F(\lambda,d,a)\right\}+\frac{X_i d\cos\alpha}{60\pi}\right)^2}} \quad \text{(i)}$$

wherein $\alpha$ is the angle of incidence of the wave, $d$ is the axis to axis spacing of the wires, $a$ is the radius of wires, $\lambda$ is the wave length of the radiation, $R_i$ and $X_i$ are respectively the resistive and reactive parts of the internal impedance of a single wire and are properly defined in the publication "Fields and Waves in Modern Radio," by Ramo, S., and Whinnery, J. R., published by Wiley, Article 6.09, the function F is an infinite series for which numerical values have been given in the publication "Journal of the Institute of Electrical Engineers," by G. G. MacFarlane, part 3A, 593, page 1523, 1946. The phase change on reflection from a single screen is:

$$\theta=\cos^{-1}\left\{-\rho\left(1+\frac{d\cos\alpha}{60\pi}R_i\right)\right\} \quad \text{(ii)}$$

The angle $\theta$ lies between 90° to 180°.

It is obvious from Equation i and Equation ii that $$\rho e^{i\theta}=\frac{-1}{\left(1+\frac{d\cos\alpha}{60\pi}R_i\right)+i\left(\frac{2d\cos\alpha}{\lambda}\left\{ln\frac{d}{2\pi a}+F(\lambda,d,a)\right\}+\frac{d\cos\alpha}{60\pi}X_i\right.}$$

When two screens are placed parallel to each other a distance $s$ apart they will transmit, with only small loss, radiation of wave lengths $$\lambda=\frac{2\pi s \cos \alpha}{\theta+(n-1)\pi} \qquad \text{(iii)}$$

wherein $n$ may be any integer value 1, 2, 3, etc. All other wave lengths will be rejected (reflected) by the double screens, provided there are no wave lengts shorter than $d$ $(1+\sin \alpha)$ in the incident radiation. Wave lengths very close to the center frequencies given by Equation iii will be passed to some extent, the effective width of the pass band being $$\Delta\lambda=\frac{2\lambda}{\theta+(n-1)\pi}\sin^{-1}\left(\frac{1-\rho^2}{2\rho}\right) \qquad \text{(iv)}$$

For use as an interference monochromator (filter), the requirements might be (*a*) pass the center frequency $\lambda$, (*b*) having effective width $\Delta\lambda$, (*c*) to operate at the first order interference, i. e. $n=1$, (*d*) the radiation being incident at angle $\alpha$. Wave lengths shorter than $\lambda_{min}$ have previously or will subsequently be removed by roughening filters. The filters are to be made of wires having a conductivity $\sigma$.

It is recommended that the necessary solution of the foregoing equations to determine $d$, $a$, and the spacing between grids $s$ be made as follows:

(1) Assume for the moment that $\sigma=\infty$. In this case Equation iv can be shown to reduce to $$\Delta\lambda=\frac{2\lambda}{\cos^{-1}(-\rho)+\pi}\sin^{-1}\left(\frac{1-\rho^2}{2\rho}\right) \qquad \text{(v)}$$

from which $\rho$ can be determined directly.

(2) Equation i reduces to $$\rho=\left[1+\left(\frac{2d\cos\alpha}{\lambda}\left\{ln\frac{d}{2\pi a}+(F\lambda,d,a)\right\}\right)\right]^{-\frac{1}{2}} \qquad \text{(vi)}$$

large $d$ and large $a$, or small $d$ and small $a$ may give the same value for $\rho$. The value of $d$ is therefore to be chosen by auxiliary considerations, subject to the condition $$d\angle\frac{\lambda_{min}}{1+\sin\alpha}$$

In general for the same value of $\rho$, larger wires introduce less ohmic loss although this is not at all critical; relatively large wires may also be desired for mechanical strength. Having settled on the value of $d$, Equation vi determines $a$.

(3) The next step is to compute the effects of finite conductivity by recomputing $p$, this time using Equation i and the values of $d$ and $a$ already found. Also $\theta$ must be computed by Equation ii.

(4) The exact pass band is now obtained from Equation iv. In most cases it will be sufficiently close to the original requirement that it will be acceptable, however, if the inclusion of the finite wire conductivity results in a value for $\Delta\lambda$ which is too far from the required value, it will be necessary to change either the wire size or the axis to axis spacing or both, and recompute until by trial and error a satisfactory band pass is obtained.

(5) The required spacings between the screens may be found by solving Equation iii.

The above formulas take into consideration only that a polarized source of energy is being passed through a grating of only parallel wires, however, for nonpolarized sources the above equations may also be used since it has been experimentally determined that they will behave very similarly.

Although in the above description the screens have been described as being self-supporting electrical conductors, it will sometimes be found desirable to use such fine wires and such close spacing between the axis of the wires that they will not be self-supporting and therefore they may well be formed on or in a dielectric supporting member.

What is claimed is:

A band pass filter for electromagnetic waves adapted to be inserted between a source and a receiver of electromagnetic waves, said filter consisting of a first and a second screen, said screens being positioned in parallel spaced relationship with said second screen completely behind said first screen relative to said source whereby the waves from said source reaching said second screen are limited to those passing through said first screen, said first and second screens being alike and each comprising parallel highly conductive wires of such size and spacing as to provide at the center wavelength of the desired pass band a ratio ($\rho$) of reflected wave amplitude to incident wave amplitude determined by the desired pass band width, and the spacing of said screens being such that the wave reflected from the second screen completely cancels the wave reflected from the first screen at the center wave length of the desired pass band.

References Cited in the file of this patent

UNITED STATES PATENTS

| | | |
|---|---|---|
| 1,781,046 | Bethenod | Nov. 11, 1930 |
| 2,455,888 | Brown | Dec. 7, 1948 |
| 2,538,035 | Pickles | Jan. 16, 1951 |
| 2,554,936 | Burtner | May 29, 1951 |
| 2,577,619 | Kock | Dec. 4, 1951 |

FOREIGN PATENTS

| | | |
|---|---|---|
| 582,007 | Germany | Aug. 7, 1933 |
| 668,231 | Germany | Nov. 28, 1938 |